US012776904B2

(12) United States Patent
Patel et al.

(10) Patent No.: US 12,776,904 B2
(45) Date of Patent: Oct. 27, 2026

(54) NETWORK DEVICE HOST KEY VERIFICATION BY NETWORK CONTROLLER USING A CRYPTOGRAPHIC CHANNEL AND A LIST OF AUDIT EVENTS

(71) Applicant: Cisco Technology, Inc., San Jose, CA (US)

(72) Inventors: Deep Chand Patel, Sunnyvale, CA (US); Kannan Krishnamurthy, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 142 days.

(21) Appl. No.: 18/950,561

(22) Filed: Nov. 18, 2024

(65) Prior Publication Data

US 2026/0142806 A1 May 21, 2026

(51) Int. Cl.
*H04L 9/08* (2006.01)

(52) U.S. Cl.
CPC ............ *H04L 9/088* (2013.01); *H04L 9/0827* (2013.01); *H04L 9/0891* (2013.01)

(58) Field of Classification Search
CPC ...... H04L 9/088; H04L 9/0891; H04L 9/0827
See application file for complete search history.

(56) References Cited

U.S. PATENT DOCUMENTS 10,116,700 B2 * 10/2018 Ylonen ................. G06F 21/575
2013/0117554 A1 * 5/2013 Ylonen ................. H04L 9/0891 713/151
2018/0176199 A1 6/2018 Peterson
2018/0316676 A1 * 11/2018 Gilpin ................... H04L 9/0891
2019/0075134 A1 3/2019 Ylonen
2019/0334950 A1 10/2019 Ylonen et al.
2022/0060449 A1 * 2/2022 Head, Jr. ............... H04L 63/029
2022/0222347 A1 7/2022 Sheth et al.

FOREIGN PATENT DOCUMENTS

WO WO-2013093209 A1 * 6/2013 ........... H04L 9/0891
WO WO2023038768 A1 3/2023

* cited by examiner

*Primary Examiner* — Michael R Vaughan

(74) *Attorney, Agent, or Firm* — Lee & Hayes, P.C.

(57) ABSTRACT

Techniques and architecture are described that leverage a trusted cryptographic channel by a network controller to authenticate an unfamiliar host key found on a network device when the network controller is attempting to establish a secure connection over a secure channel. The network controller may authenticate an unfamiliar host key found on a network device by using the trusted cryptographic channel to retrieve the network device's host keys directly from the network device when the network controller encounters the unfamiliar host key. Additionally, the network controller may correlate all the audit events available to the network controller with the appearance of the unfamiliar host key and accepting the unfamiliar host key only if the unfamiliar host key is confirmed to be present on the network device and if the audit events indicate that the unfamiliar host key was recently properly installed or generated on the network device.

20 Claims, 5 Drawing Sheets

NETWORK DEVICE HOST KEY VERIFICATION BY NETWORK CONTROLLER USING A CRYPTOGRAPHIC CHANNEL AND A LIST OF AUDIT EVENTS

TECHNICAL FIELD

The present disclosure relates generally to verification of network device host keys by a network controller, and more particularly, to unfamiliar network device host key verification by a network controller using a cryptographic channel and a list of audit events.

BACKGROUND

Within networks, including fabric networks, a network controller often uses secure shell (SSH) protocol to communicate with network devices, e.g., managed devices, such as, for example, routers, switches, etc. For example, the network controller uses a SSH channel to send commands, receive/transmit data, etc. When the SSH client on the network controller encounters an unfamiliar (e.g., new) SSH host key on a network device, the SSH client typically requires manual user approval of the unfamiliar SSH host key. Alternatively, a network controller must refer to a preapproved whitelist of SSH host keys. As is known, security of the network is extremely important. Accordingly, verification of the unfamiliar SSH host key is needed since the SSH host key may be part of, for example, a spoofing attempt, e.g., a man-in-the-middle attack.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
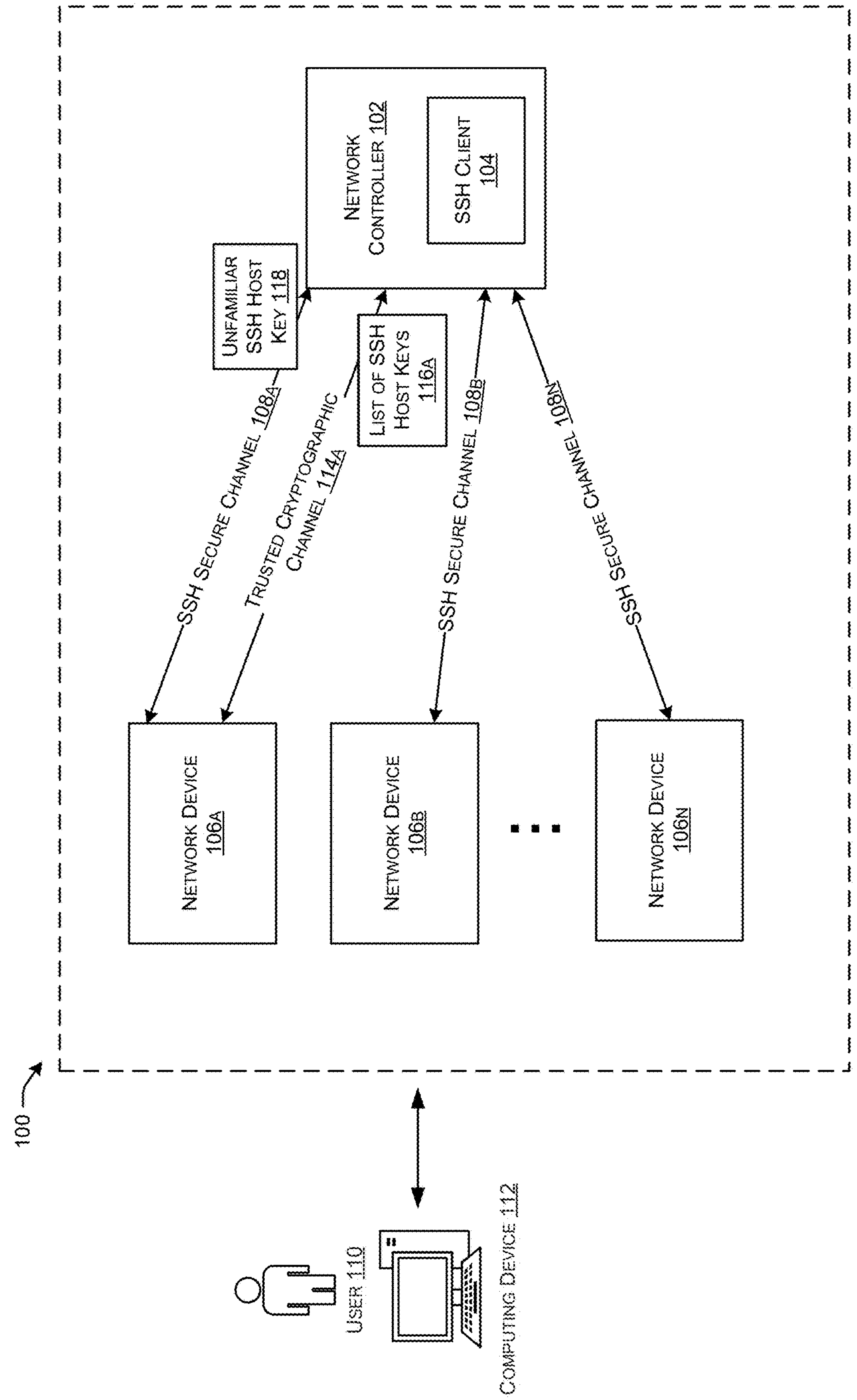
FIG. 1A schematically illustrates an example of a portion of a network, where an unfamiliar SSH host key found by a network controller on a network device is authenticated by using a trusted cryptographic channel to retrieve the network device's SSH host keys directly from the network device and correlating all the audit events available to the network controller with the appearance of a new SSH host key, in accordance with techniques and architecture described herein.

The present disclosure provides techniques and architecture that leverage a trusted cryptographic channel, e.g., a trusted transport layer security (TLS) protocol channel, by a network controller to authenticate an unfamiliar host key, e.g., an unfamiliar secure shell (SSH) host key, found on a network device, e.g., a router, a switch, etc., when the network controller is attempting to establish a secure connection over a secure channel, e.g., a SSH protocol channel. More particularly, the network controller uses various communication channels to interact with network devices, e.g., managed devices, such as, for example, routers, switches, etc. The TLS channel is often a significant communication channel. For example, the TLS channel on the network controller allows for the cryptographic verification of a network device's identity through the network device's TLS server certificate.

In configurations, the network controller may authenticate an unfamiliar SSH host key found on a network device by using the trusted cryptographic channel to retrieve the network device's SSH host keys directly from the network device when a new SSH host key is encountered, e.g., the network controller encounters an unfamiliar SSH host key. Additionally, in configurations, the network controller may correlate all the audit events available to the network controller with the appearance of the unfamiliar SSH host key and accepting the SSH host key only if the SSH host key is confirmed to be present on the network device and if the audit events indicate that the SSH host key was recently properly installed or generated on the network device. Such a process helps ensure that the network controller only accepts a new SSH host key from a network device when there is clear evidence that the new SSH host key is tied to the network device in question.

As an example, a method may comprise attempting, by a controller via a secure channel, to establish a secure connection with a network device via the secure channel. The method may also comprise encountering, by the controller, a host key at the network device, wherein the controller is unfamiliar with the host key. The method may further comprise retrieving, by the controller via a cryptographic channel and from the network device, a list of host keys on the network device. The method may additionally comprise based on the host key being present on the list of host keys, evaluating, by the controller, a list of audit events indicating host key generation events. The method may also comprise based on a positive evaluation of the list of audit events, confirming, by the controller, validity of the host key. The method may further comprise based on the confirming the validity of the host key, establishing, by the controller via the secure channel, the secure connection with the network device.

Example Embodiments

In accordance with configurations described herein, as previously noted, the present disclosure provides techniques and architecture that leverage a trusted cryptographic channel, e.g., a trusted transport layer security (TLS) protocol channel, by a network controller to authenticate an unfamiliar secure shell (SSH) host key found on a network device, e.g., a router, a switch, etc. More particularly, the network controller uses various communication channels to interact with network devices, e.g., managed devices, such as, for example, routers, switches, etc. The TLS channel is often a significant communication channel. For example, the TLS channel on the network controller allows for the cryptographic verification of a network device's identity through the network device's TLS server certificate.

In configurations, the network controller may authenticate an unfamiliar SSH host key found on a network device by using the trusted cryptographic channel to retrieve the network device's SSH host keys directly from the network device when a new SSH host key is encountered, e.g., the network controller encounters an unfamiliar SSH host key. Additionally, in configurations, the network controller may correlate all the audit events available to the network controller with the appearance of a new SSH host key and accepting the SSH host key only if the SSH host key is confirmed to be present on the network device and if the audit events indicate that the SSH host key was recently properly installed or generated on the network device. Such a process helps ensure that the network controller only accepts a new SSH host key from a network device when there is clear evidence that the new SSH host key is tied to the network device in question.

More particularly, the network controller may encounter a new network device SSH host key under several circumstances. For example, the network controller, when connecting to a network device via SSH for the first time will encounter the network device's SSH host key for the first time. As another example, if a new host key has been generated on the network device, the network controller will encounter the new network device's host key for the first time when the network controller attempts to establish a secure connection with the network device. As a further example, following a software upgrade on the network device, a new host key may be generated that the network controller may encounter. As another example, following a hardware replacement on the network device, a new host key may be generated that the network controller may encounter. As a further example, if there is a spoofing attempt and a man-in-the-middle attack is underway at a network device, the network controller may encounter an unfamiliar host key. As another example, when a host key has been installed on the network device without the awareness or authorization of a user or the network controller, the network controller may encounter an unfamiliar host key on the network device.

To ensure that the network controller is genuinely connecting to the correct network device, the network controller must validate any unfamiliar or new host key. Such a validation process confirms that the host key is associated with the network device and that the unfamiliar host key was established through authorized methods. The techniques and architecture described herein are applicable for scenarios where the network device is operational, and a trusted cryptographic channel, e.g., a transport layer security (TLS) channel, such as, for example, a Nexus (NX)-application programming interface (API) (NX-API) on a Nexus dashboard fabric controller (NDFC), has been successfully established between the network controller and the network device.

More particularly, in configurations, the network controller may attempt to establish a secure connection over a secure channel, e.g., a SSH connection over a SSH channel, to a network device and encounters a SSH host key from the network device that the network controller has not seen before, e.g., the network controller encounters an unfamiliar host key. The network controller may then establish a connection to the network device using a secure, cryptographic channel, e.g., a secure TLS channel, such as NX-API on NDFC, to retrieve a list of SSH host keys stored on the network device. The network controller may check whether the unfamiliar host key is included in the list of host keys obtained from the network device. The TLS channel is tied to the network device's TLS server certificate and may be verified cryptographically by the network controller.

If the newly seen/unfamiliar SSH host key is not found on the network device, e.g., the newly seen/unfamiliar SSH host key is not included in the list of host keys obtained from the network device, the newly seen/unfamiliar SSH host key is rejected by the network controller. This often indicates a spoofing attempt, e.g., man-in-the-middle attack. The attempt to establish a secure connection over the SSH channel is discontinued by the network controller. An alert may also be sent by the network controller to the user.

If the newly seen/unfamiliar SSH host key is verified to be on the network device e.g., the newly seen/unfamiliar SSH host key is included in the list of host keys obtained from the network device, the network controller reviews a list of audit events accessible to the network controller and those present on the network device to ensure that the newly seen/unfamiliar SSH host key was properly generated by a user with the appropriate credentials and privileges. If the audit events suggest that the host key generation was initiated by an unauthorized user or do not align with recent SSH host key generation events, the network controller may trigger an alert and inform a proper user about the potentially compromised SSH host key thereby prompting further action.

Examples of audit events include, but are not limited to, the following audit events that point to generation of new host keys on the system and should be correlated when a new host key is encountered. A first example audit event may include the network controller has configured/generated a new host key. This may be possible when key size or key type is being changed. A second example audit event may include the network device being returned to a manufacturer and/or being upgraded for new software that resulted in a new host key. A third example audit event may include a user installing a host key on the network device manually and informing the network controller.

Accordingly, in configurations, a method comprises attempting, by a controller via a secure channel, to establish a secure connection with a network device via the secure channel. The method also comprises encountering, by the controller, a host key at the network device, wherein the controller is unfamiliar with the host key. The method further comprises retrieving, by the controller via a cryptographic channel and from the network device, a list of host keys on the network device. The method additionally comprises based on the host key being present on the list of host keys, evaluating, by the controller, a list of audit events indicating host key generation events. The method also comprises based on a positive evaluation of the list of audit events, confirming, by the controller, validity of the host key. The method further comprises based on the confirming the validity of the host key, establishing, by the controller via the secure channel, the secure connection with the network device.

In some configurations, the method also comprises based on the host key not being present on the list of host keys, rejecting, by the controller, the host key. In such configurations, the method further comprises discontinuing, by the controller, attempting to establish the secure connection with the network device via the secure channel.

In some configurations, the method further comprises based on a negative evaluation of the list of audit events, rejecting, by the controller, the host key. In such configurations, the method also comprises discontinuing, by the controller, attempting to establish the secure connection with the network device via the secure channel. In additional configurations, the method further comprises providing, by the controller, an alert to a user regarding the host key.

In further configurations, the secure channel comprises a secure shell (SSH) channel.

In some configurations, the cryptographic channel comprises a transport layer security (TLS) channel.

In additional configurations, the method further comprises verifying, cryptographically by the controller, the TLS channel.

In further configurations, the list of audit events comprises one or more of (i) the controller has configured a new host key for the network device, (ii) the network device has been returned to a manufacturer resulting in a new host key, (iii) the network device has been upgraded with new software resulting in a new host key, or (iv) a user has manually installed a new host key on the network device.

Thus, the techniques and architecture described herein leverage a trusted cryptographic channel, e.g., a trusted transport layer security (TLS) protocol channel, by a network controller to authenticate an unfamiliar host key, e.g., an unfamiliar secure shell (SSH) host key, found on a network device, e.g., a router, a switch, etc., when the network controller is attempting to establish a secure connection over a secure channel, e.g., a SSH protocol channel. An unfamiliar host key encountered by the network controller for a network device could be the sign of a spoofing attempt. The techniques and architecture described herein provide a way to verify the unfamiliar host key using a cryptographically trusted channel, e.g., a TLS channel, between the network controller and the network device to see if indeed the unfamiliar host key is tied to the network device in question. Furthermore, once the unfamiliar host key is indeed found on the network device, the unfamiliar host may be correlated with audit events to ensure the unfamiliar host key was the result of an intended action. Host key verification failure through trusted channel or negative correlation with audit events leads to rejection of the unfamiliar host key. The techniques and architecture thereby automate the process and add to trust of the network. When a secure and trusted cryptographic channel, e.g., a TLS channel, is established, any new host key is automatically verified through an established mechanism. This process requires no manual whitelist maintenance or user intervention unless the mechanism identifies a host key as suspicious. The system is designed to detect spoofing attempts and unauthorized manipulation of the host keys on the network device.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A schematically illustrates an example of a portion of a network 100. In configurations, the network 100 may be in the form of (or at least include) a fabric network. The network 100 includes a network controller 102. In configurations, the network controller 102 includes a secure shell (SSH) client 104. The network controller 102 communicates with a plurality of network devices 106*a*-106*n*, e.g., routers, switches, etc., via a corresponding secure communication channel 108*a*-108*n*. In configurations, the secure communication channels 108*a*-108*n* may be configured in accordance with SSH protocol and thus may be referred to herein as SSH communication channels 108 or SSH secure channels 108. The SSH communication channels 108 allow the network controller 102 to, for example, send commands and/or receive/transmit data to and from the network devices 106. A user 110, using a client device 112, may interact with the network controller 102 and/or the network devices 106.

The network controller 102 may attempt to establish a secure connection over the secure channel 108*a*, e.g., a SSH channel, with the network device 106*a*. While attempting to establish the secure connection over the secure channel 108*a* with the network device 106*a*, the network controller 102 may encounter an unfamiliar SSH host key 118. In configurations, the network controller 102 may authenticate the unfamiliar SSH host key 118 found on a network device 106, e.g., network device 106*a*, by using a trusted cryptographic channel 114*a* to retrieve the network device's SSH host keys 116*a* directly from the network device 106*a* when a new SSH host key is encountered, e.g., the network controller 102 encounters the unfamiliar SSH host key 118. Additionally, in configurations, the network controller 102 may correlate all the audit events available to the network controller 102 with the appearance of a new SSH host key and accepting the SSH host key only if the SSH host key is confirmed to be present on the network device 106*a* and if the audit events indicate that the SSH host key was recently properly installed or generated on the network device 106*a*. Such a process helps ensure that the network controller 102 only accepts a new SSH host key from a network device 106 when there is clear evidence that the new SSH host key is tied to the network device in question.

More particularly, the network controller 102 may encounter a new network device SSH host key under several circumstances. For example, the network controller 102, when connecting to a network device 106 via SSH for the first time will encounter the network device's SSH host key for the first time. As another example, if a new host key has been generated on the network device, the network controller 102 will encounter the new network device's host key for the first time when the network controller 102 attempts to establish a secure connection over a corresponding SSH channel 108 with the network device 106. As a further example, following a software upgrade on the network device 106, a new host key may be generated that the network controller 102 may encounter. As another example, following a hardware replacement on the network device 106, a new host key may be generated that the network controller 102 may encounter. As a further example, if there is a spoofing attempt and a man-in-the-middle attack is underway at a network device 106, the network controller 102 may encounter an unfamiliar host key. As another example, when a host key has been installed on the network device 106 without the awareness or authorization of the user 110 or the network controller 102, the network controller 102 may encounter an unfamiliar host key on the network device 106.

To ensure that the network controller 102 is genuinely connecting to the correct network device 106, e.g., network device 106*a*, the network controller 102 must validate any unfamiliar or new host key. Such a validation process confirms that the host key is associated with the network device 106*a* and that the unfamiliar host key was established through authorized methods. The techniques and architecture described herein are applicable for scenarios where the network device is operational, and a trusted cryptographic channel, e.g., a transport layer security (TLS) channel, such as, for example, a Nexus (NX)-application programming interface (API) (NX-API) on a Nexus dashboard fabric controller (NDFC), has been successfully established between the network controller 102 and the network device 106*a*.

More particularly, in configurations, the network controller 102 may attempt to establish a secure connection over a secure channel, e.g., a SSH connection over the SSH channel 108*a*, to the network device 106*a* and encounters a SSH host key from the network device 106*a* that the network controller 102 has not seen before, e.g., the network controller 102 encounters an unfamiliar host key such as unfamiliar SSH host key 118. The network controller 102 may then establish a connection to the network device 106*a* using a secure, cryptographic channel, e.g., a secure TLS channel 114*a*, such as NX-API on NDFC, to retrieve a list of SSH host keys stored on the network device 106*a*. The network controller 102*a* may check whether the unfamiliar host key is included in the list of host keys obtained from the network device 106*a*. The TLS channel 114*a* is tied to the network device's TLS server certificate and may be verified cryptographically by the network controller 102.

If the newly seen/unfamiliar SSH host key 118 is not found on the network device 106*a*, e.g., the newly seen/unfamiliar SSH host key 118 is not included in the list of host keys obtained from the network device 106*a*, the newly seen/unfamiliar SSH host key 118 is rejected by the network controller 102. This often indicates a spoofing attempt, e.g., man-in-the-middle attack. The attempt to establish a secure connection over SSH channel 108*a* is discontinued by the network controller 102. An alert may also be sent by the network controller 102 to the user 110.

If the newly seen/unfamiliar SSH host key 118 is verified to be on the network device 106*a*, e.g., the newly seen/unfamiliar SSH host key 118 is included in the list of host keys 116*a* obtained from the network device 106*a*, the network controller 102 reviews a list of audit events accessible to the network controller 102 and those present on the network device 106*a* to ensure that the newly seen/unfamiliar SSH host key 118 was properly generated by a user, e.g., the user 110, with the appropriate credentials and privileges. If the list of audit events 120 confirms the validity of the newly seen/unfamiliar SSH host key 118, the network controller 102 may establish the secure connection over the SSH channel 108*a* between the network controller 102 and the network device 106*a*.

If the audit events suggest that the host key generation was initiated by an unauthorized user or do not align with recent SSH host key generation events, the network controller 102 may trigger an alert and inform a proper user about the potentially compromised SSH host key thereby prompting further action.

Examples of audit events include, but are not limited to, the following audit events that point to generation of new host keys on the system and should be correlated when a new host key is encountered. A first example audit event may include the network controller 102 has configured/generated a new host key. This may be possible when key size or key type is being changed. A second example audit event may include the network device 106 being returned to a manufacturer and/or being upgraded for new software that resulted in a new host key. A third example audit event may include the user 110 installing a host key on the network device 106 manually and informing the network controller 102.

Figure 1B:
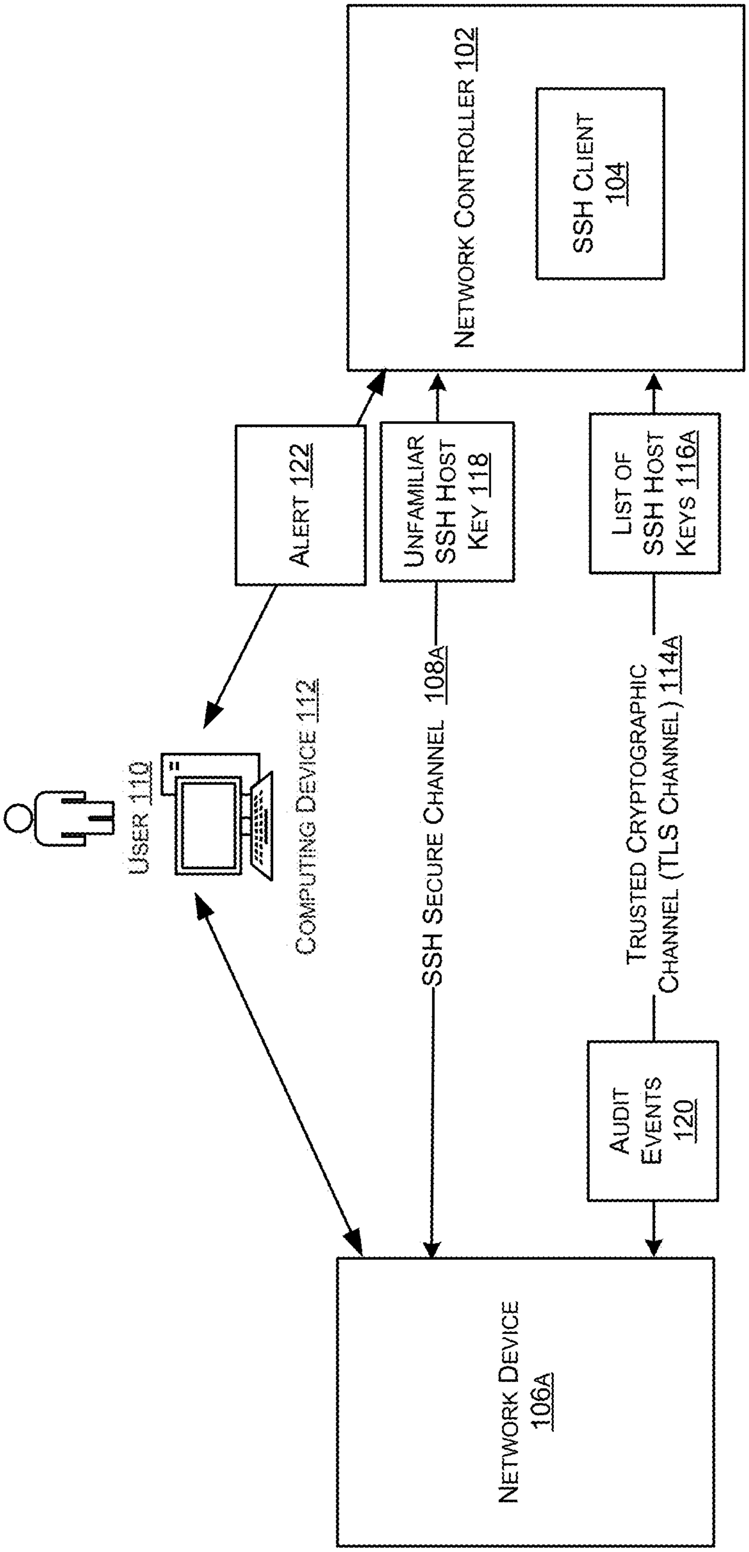
FIG. 1B schematically illustrates an example of a network controller and a network device of the example portion of the network of FIG. 1A, where an unfamiliar SSH host key found by a network controller on a network device is authenticated by using a trusted cryptographic channel to retrieve the network device's SSH host keys directly from the network device and correlating all the audit events available to the network controller with the appearance of a new SSH host key, in accordance with techniques and architecture described herein.

FIG. 1B schematically illustrates an example of network controller 102 and network device 106*a* of the example portion of the network 100 of FIG. 1A. The network controller may attempt to establish a secure connection over the secure channel 108*a*, e.g., a SSH channel, with the network device 106*a*. While attempting to establish the secure connection over the secure channel 108*a* with the network device 106*a*, the network controller 102 may encounter an unfamiliar SSH host key 118. In configurations, the network controller 102 may authenticate the unfamiliar SSH host key 118 found on the network device 106*a*, by using the trusted cryptographic channel 114*a* to retrieve the network device's SSH host keys 116*a* directly from the network device 106*a* when the network controller 102 encounters the unfamiliar SSH host key 118. Additionally, in configurations, the network controller 102 may correlate all the audit events 120 available to the network controller 102 with the appearance of the unfamiliar SSH host key 118 and accepting the SSH host key 118 only if the SSH host key 118 is confirmed to be present on the network device 106*a* and if the audit events 120 indicate that the SSH host key 118 was recently properly installed or generated on the network device 106*a*. Such a process helps ensure that the network controller 102 only accepts the unfamiliar SSH host key 118 from a network device 106 when there is clear evidence that the unfamiliar SSH host key 118 is tied to the network device 106*a*.

More particularly, the network controller 102 may encounter the unfamiliar network device SSH host key 118 under several circumstances. For example, the network controller 102, when connecting to the network device 106*a* via SSH for the first time will encounter the unfamiliar SSH host key 118 for the first time. As another example, if the unfamiliar SSH host key 118 has been generated on the network device 106*a*, the network controller 102 will encounter the unfamiliar SSH host key 118 for the first time when the network controller 102 attempts to establish a secure connection over the corresponding SSH channel 108*a* with the network device 106*a*. As a further example, following a software upgrade on the network device 106*a*, the unfamiliar host key 118 may be generated that the network controller 102 may encounter. As another example, following a hardware replacement on the network device 106*a*, the unfamiliar SSH host key 118 may be generated that the network controller 102 may encounter. As a further example, if there is a spoofing attempt and a man-in-the-middle attack is underway at a network device 106, the network controller 102 may encounter an unfamiliar host key, e.g., unfamiliar SSH host key 118. As another example, when the unfamiliar SSH host key 118 has been installed on the network device 106 without the awareness or authorization of the user 110 or the network controller 102, the network controller 102 may encounter the unfamiliar SSH host key 118 on the network device 106.

To ensure that the network controller 102 is genuinely connecting to the correct network device 106*a* the network controller 102 must validate any unfamiliar or new host key, e.g., unfamiliar SSH host key 118. Such a validation process confirms that the host key is associated with the network device 106*a* and that the unfamiliar host key 118 was established through authorized methods. The techniques and architecture described herein are applicable for scenarios where the network device is operational, and a trusted cryptographic channel, e.g., a transport layer security (TLS) channel, such as, for example, a Nexus (NX)-application programming interface (API) (NX-API) on a Nexus dashboard fabric controller (NDFC), has been successfully established between the network controller 102 and the network device 106*a*.

More particularly, in configurations, the network controller 102 may attempt to establish a secure connection over a secure channel, e.g., a SSH connection over the SSH channel 108*a*, to the network device 106*a* and encounters the SSH host key 118 from the network device 106*a* that the network controller 102 has not seen before, e.g., the network controller 102 encounters an unfamiliar host key. The network controller 102 may then establish a connection to the network device 106*a* using a secure, cryptographic channel, e.g., the secure TLS channel 114*a*, such as NX-API on NDFC, to retrieve the list of SSH host keys 116*a* stored on the network device 106*a*. The network controller 102*a* may check whether the unfamiliar host key 118 is included in the list of host keys 116*a* obtained from the network device 106*a*. The TLS channel 114*a* is tied to the network device's TLS server certificate and may be verified cryptographically by the network controller 102.

If the newly seen/unfamiliar SSH host key 118 is not found on the network device 106*a*, e.g., the newly seen/unfamiliar SSH host key 118 is not included in the list of host keys 116*a* obtained from the network device 106*a*, the newly seen/unfamiliar SSH host key 118 is rejected by the network controller 102. This often indicates a spoofing attempt, e.g., man-in-the-middle attack. The attempt to establish a secure connection over SSH channel 108*a* is discontinued by the network controller 102. An alert 122 may also be sent by the network controller 102 to the user 110.

If the newly seen/unfamiliar SSH host key 118 is verified to be on the network device 106*a*, e.g., the newly seen/unfamiliar SSH host key 118 is included in the list of host keys obtained from the network device 106*a*, the network controller 102 reviews a list of audit events 120 accessible to the network controller 102 and those present on the network device 106*a* to ensure that the newly seen/unfamiliar SSH host key 118 was properly generated by a user, e.g., the user 110, with the appropriate credentials and privileges. If the list of audit events 120 confirms the validity of the unfamiliar SSH host key 118, the network controller 102 may establish the secure connection over the SSH channel 108*a* between the network controller 102 and the network device 106*a*.

If the audit events 120 suggest that the host key generation was initiated by an unauthorized user or do not align with recent SSH host key generation events, the network controller 102 may trigger an alert 122 and inform a proper user about the potentially compromised SSH host key thereby prompting further action. The attempt to establish a secure connection over SSH channel 108*a* is discontinued by the network controller 102.

Examples of audit events include, but are not limited to, the following audit events that point to generation of new host keys on the system and should be correlated when a new host key is encountered. A first example audit event may include the network controller 102 has configured/generated the unfamiliar SSH host key 118. This may be possible when key size or key type is being changed. A second example audit event may include the network device 106*s* being returned to a manufacturer and/or being upgraded for new software that resulted in the unfamiliar SSH host key 118. A third example audit event may include the user 110 installing the unfamiliar SSH host key 118 on the network device 106 manually and informing the network controller 102.

Figure 2:
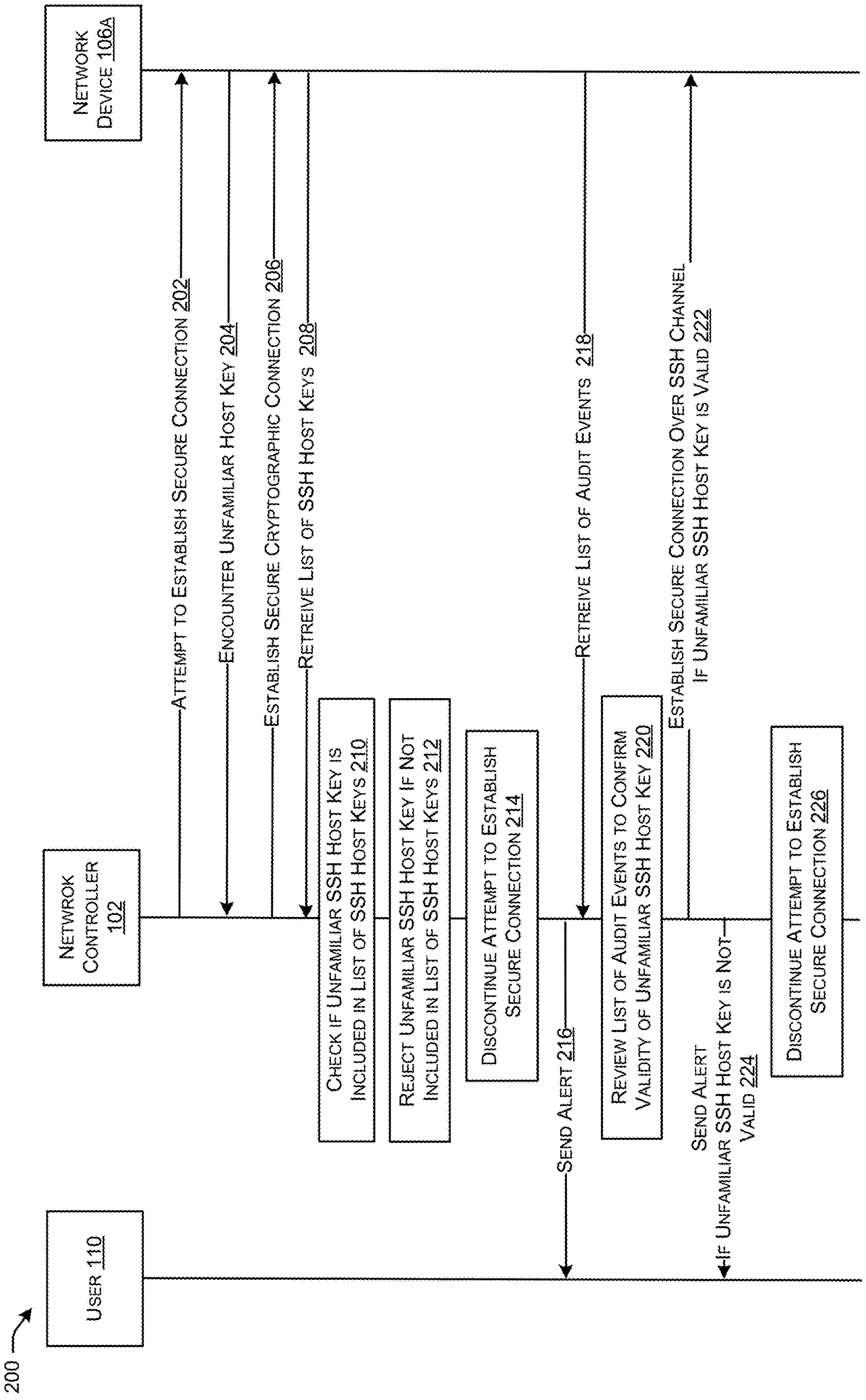
FIG. 2 is a flow diagram of an example process of authenticating an unfamiliar SSH host key found by a network controller on a network device by using a trusted cryptographic channel to retrieve the network device's SSH host keys directly from the network device and correlating all the audit events available to the network controller with the appearance of the unfamiliar SSH host key, in accordance with techniques and architecture described herein.

FIG. 2 is a flow diagram of an example process 200 of authenticating a newly seen/unfamiliar SSH host key found by the network controller 102 on the network device 106*a* by using a trusted cryptographic channel 114*a* to retrieve the network device's SSH host keys directly from the network device 106*a* and correlating all the audit events available to the network controller 102 with the appearance of the unfamiliar SSH host key. At 202, in configurations, the network controller 102 attempts to establish a secure connection over a secure channel, e.g., a SSH connection over the SSH channel 108*a*, to the network device 106*a*. At 204, the network controller 102 encounters a newly seen/unfamiliar SSH host key from the network device 106*a* that the network controller 102. At 206, the network controller 102 establishes a connection to the network device 106*a* using a secure, cryptographic channel, e.g., the secure TLS channel 114*a*, such as NX-API on NDFC. At 208, the network controller 102 retrieves a list of SSH host keys 116*a* stored on the network device 106*a*. At 210, the network controller 102*a* may check whether the newly seen/unfamiliar SSH host key is included in the list of host keys 116*a* obtained from the network device 106*a*. The TLS channel 114*a* is tied to the network device's TLS server certificate and may be verified cryptographically by the network controller 102.

If the newly seen/unfamiliar SSH host key is not found on the network device 106*a*, e.g., the newly seen/unfamiliar SSH host key is not included in the list of host keys 116*a* obtained from the network device 106*a*, at 212 the newly seen/unfamiliar SSH host key is rejected by the network controller 102. This often indicates a spoofing attempt, e.g., man-in-the-middle attack. At 214, the attempt to establish a secure connection over SSH channel 108*a* is discontinued by the network controller 102. In configurations, at 216 an alert may also be sent by the network controller 102 to the user 110.

If the newly seen/unfamiliar SSH host key 118 is verified to be on the network device 106*a*, e.g., the newly seen/unfamiliar SSH host key is included in the list of host keys obtained from the network device 106*a*, at 218 the network controller 102 retrieves a list of audit events accessible to the network controller 102 and those present on the network device 106*a*. At 220, the network controller 102 reviews the list of audit events 120 to ensure that the newly seen/unfamiliar SSH host key was properly generated by a user, e.g., the user 110, with the appropriate credentials and privileges. If the list of audit events 120 confirms the validity of the unfamiliar SSH host key 118, at 222 the network controller 102 may establish the secure connection over the SSH channel 108*a* between the network controller 102 and the network device 106*a*.

If the audit events 120 suggest that the host key generation was initiated by an unauthorized user or do not align with recent SSH host key generation events, at 224 the network controller 102 may trigger an alert and inform the user 110 about the potentially compromised SSH host key thereby prompting further action. At 226, the attempt to establish a secure connection over SSH channel 108*a* is discontinued by the network controller 102.

Figure 3:
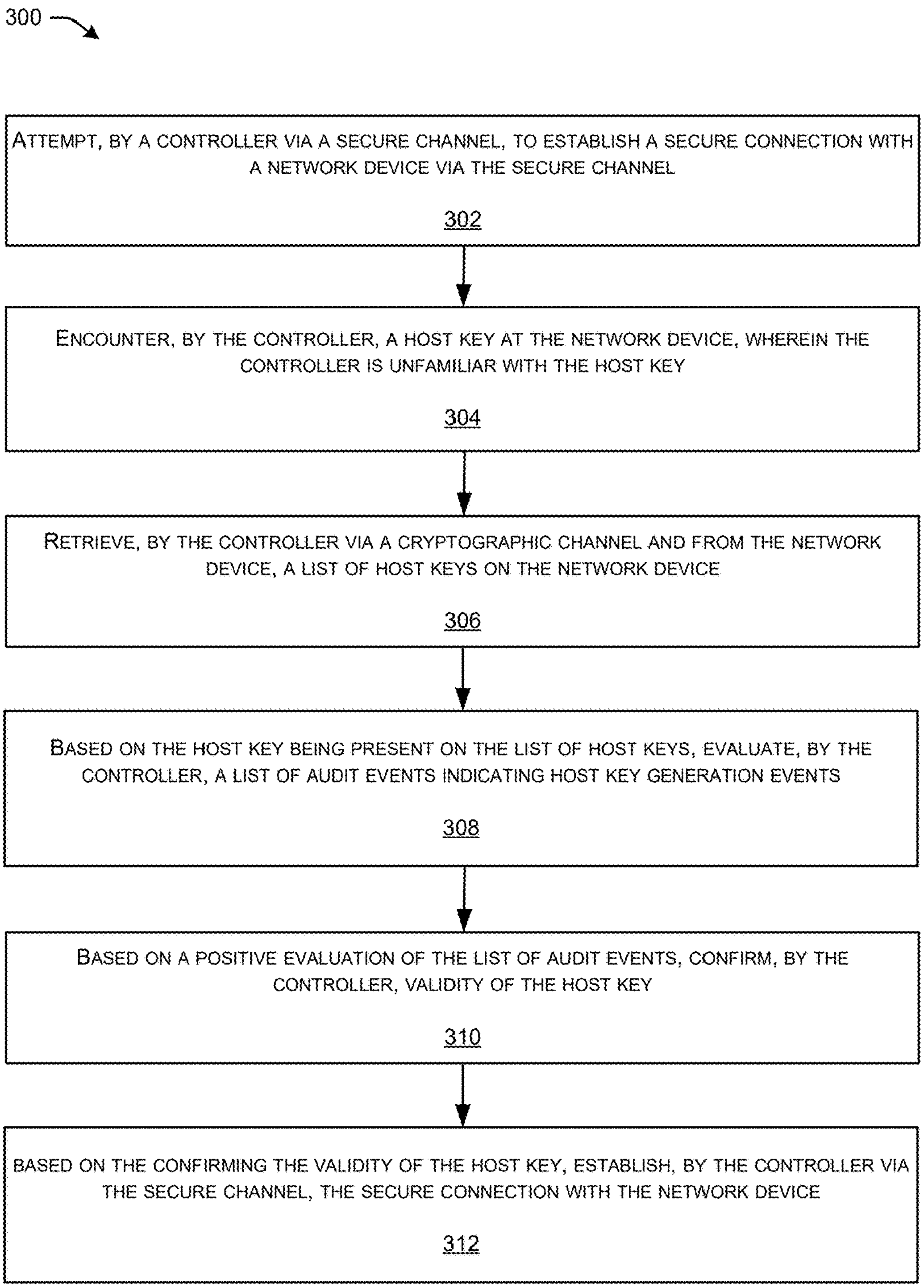
FIG. 3 illustrates a flow diagram of an example method for authenticating an unfamiliar SSH host key found by a network controller on a network device by using a trusted cryptographic channel to retrieve the network device's SSH host keys directly from the network device and correlating all the audit events available to the network controller with the appearance of the unfamiliar SSH host key, in accordance with the techniques and architecture described herein.

FIG. 3 illustrates a flow diagram of an example method 300 and illustrates aspects of the functions performed at least partly by devices of a network as described with respect to FIGS. 1A, 1B, and 2. The logical operations described herein with respect to FIG. 3 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 3 illustrates a flow diagram of an example method 300 for authenticating an unfamiliar SSH host key found by a network controller on a network device by using a trusted cryptographic channel to retrieve the network device's SSH host keys directly from the network device and correlating all the audit events available to the network controller with the appearance of the unfamiliar SSH host key. In some examples, the method 300 may be performed by a system comprising one or more processors and one or more non-transitory computer-readable media storing computer-executable instructions that, when executed by the one or more processors, cause the one or more processors to perform the method 300.

At 302, a controller attempts, via a secure channel, to establish a secure connection with a network device via the secure channel. For example, the network controller 102 may attempt to establish a secure connection over the secure channel 108*a*, e.g., a SSH channel, with the network device 106*a*.

At 304, the controller encounters a host key at the network device, wherein the controller is unfamiliar with the host key. For example, while attempting to establish the secure connection over the secure channel 108*a* with the network device 106*a*, the network controller 102 may encounter an unfamiliar SSH host key, e.g., unfamiliar SSH host key 118. More particularly, the network controller 102 may encounter a new network device SSH host key under several circumstances. For example, the network controller 102, when connecting to a network device 106 via SSH for the first time will encounter the network device's SSH host key for the first time. As another example, if a new host key has been generated on the network device, the network controller 102 will encounter the new network device's host key for the first time when the network controller 102 attempts to establish a secure connection over a corresponding SSH channel 108 with the network device 106. As a further example, following a software upgrade on the network device 106, a new host key may be generated that the network controller 102 may encounter. As another example, following a hardware replacement on the network device 106, a new host key may be generated that the network controller 102 may encounter. As a further example, if there is a spoofing attempt and a man-in-the-middle attack is underway at a network device 106, the network controller 102 may encounter an unfamiliar host key. As another example, when a host key has been installed on the network device 106 without the awareness or authorization of the user 110 or the network controller 102, the network controller 102 may encounter an unfamiliar host key on the network device 106.

At 306, the controller retrieves, via a cryptographic channel and from the network device, a list of host keys on the network device. For example, to ensure that the network controller 102 is genuinely connecting to the correct network device 106, e.g., network device 106*a*, the network controller 102 must validate any unfamiliar or new host key. Such a validation process confirms that the host key is associated with the network device 106*a* and that the unfamiliar host key was established through authorized methods. The techniques and architecture described herein are applicable for scenarios where the network device is operational, and a trusted cryptographic channel, e.g., a transport layer security (TLS) channel, such as, for example, a Nexus (NX)-application programming interface (API) (NX-API) on a Nexus dashboard fabric controller (NDFC), has been successfully established between the network controller 102 and the network device 106*a*.

More particularly, in configurations, the network controller 102 may attempt to establish a secure connection over a secure channel, e.g., a SSH connection over the SSH channel 108*a*, to the network device 106*a* and encounters a SSH host key from the network device 106*a* that the network controller 102 has not seen before, e.g., the network controller 102 encounters an unfamiliar host key. The network controller 102 may then establish a connection to the network device 106*a* using a secure, cryptographic channel, e.g., a secure TLS channel 114*a*, such as NX-API on NDFC, to retrieve a list of SSH host keys stored on the network device 106*a*. The network controller 102*a* may check whether the unfamiliar host key is included in the list of host keys obtained from the network device 106*a*. The TLS channel 114*a* is tied to the network device's TLS server certificate and may be verified cryptographically by the network controller 102.

At 308, based on the host key being present on the list of host keys, the controller evaluates a list of audit events indicating host key generation events. For example, If the newly seen/unfamiliar SSH host key is verified to be on the network device 106*a*, e.g., the newly seen/unfamiliar SSH host key is included in the list of host keys obtained from the network device 106*a*, the network controller 102 reviews a list of audit events accessible to the network controller 102 and those present on the network device 106*a* to ensure that the newly seen/unfamiliar SSH host key was properly generated by a user, e.g., the user 110, with the appropriate credentials and privileges. If the audit events suggest that the host key generation was initiated by an unauthorized user or do not align with recent SSH host key generation events, the network controller 102 may trigger an alert 122 and inform a proper user about the potentially compromised SSH host key thereby prompting further action.

Examples of audit events include, but are not limited to, the following audit events that point to generation of new host keys on the system and should be correlated when a new host key is encountered. A first example audit event may include the network controller 102 has configured/generated a new host key. This may be possible when key size or key type is being changed. A second example audit event may include the network device 106 being returned to a manufacturer and/or being upgraded for new software that resulted in a new host key. A third example audit event may include the user 110 installing a host key on the network device 106 manually and informing the network controller 102.

If the newly seen/unfamiliar SSH host key is not found on the network device 106*a*, e.g., the newly seen/unfamiliar SSH host key is not included in the list of host keys obtained from the network device 106*a*, the newly seen/unfamiliar SSH host key is rejected by the network controller 102. This often indicates a spoofing attempt, e.g., man-in-the-middle attack. The attempt to establish a secure connection over SSH channel 108*a* is discontinued by the network controller 102. An alert 122 may also be sent by the network controller 102 to the user 110.

At 310, based on a positive evaluation of the list of audit events, the controller confirms validity of the host key. At 312, based on the confirming the validity of the host key, the controller establishes, via the secure channel, the secure connection with the network device. For example, if the list of audit events 120 confirms the validity of the unfamiliar SSH host key 118, the network controller 102 may establish the secure connection over the SSH channel 108*a* between the network controller 102 and the network device 106*a*.

Thus, the techniques and architecture described herein leverage a trusted cryptographic channel, e.g., a trusted transport layer security (TLS) protocol channel, by a network controller to authenticate an unfamiliar host key, e.g., an unfamiliar secure shell (SSH) host key, found on a network device, e.g., a router, a switch, etc., when the network controller is attempting to establish a secure connection over a secure channel, e.g., a SSH protocol channel. An unfamiliar host key encountered by the network controller for a network device could be the sign of a spoofing attempt. The techniques and architecture described herein provide a way to verify the unfamiliar host key using a cryptographically trusted channel, e.g., a TLS channel, between the network controller and the network device to see if indeed the unfamiliar host key is tied to the network device in question. Furthermore, once the unfamiliar host key is indeed found on the network device, the unfamiliar host may be correlated with audit events to ensure the unfamiliar host key was the result of an intended action. Host key verification failure through trusted channel or negative correlation with audit events leads to rejection of the unfamiliar host key. The techniques and architecture thereby automate the process and add to trust of the network. When a secure and trusted cryptographic channel, e.g., a TLS channel, is established, any new host key is automatically verified through an established mechanism. This process requires no manual whitelist maintenance or user intervention unless the mechanism identifies a host key as suspicious. The system is designed to detect spoofing attempts and unauthorized manipulation of the host keys on the network device.

Figure 4:
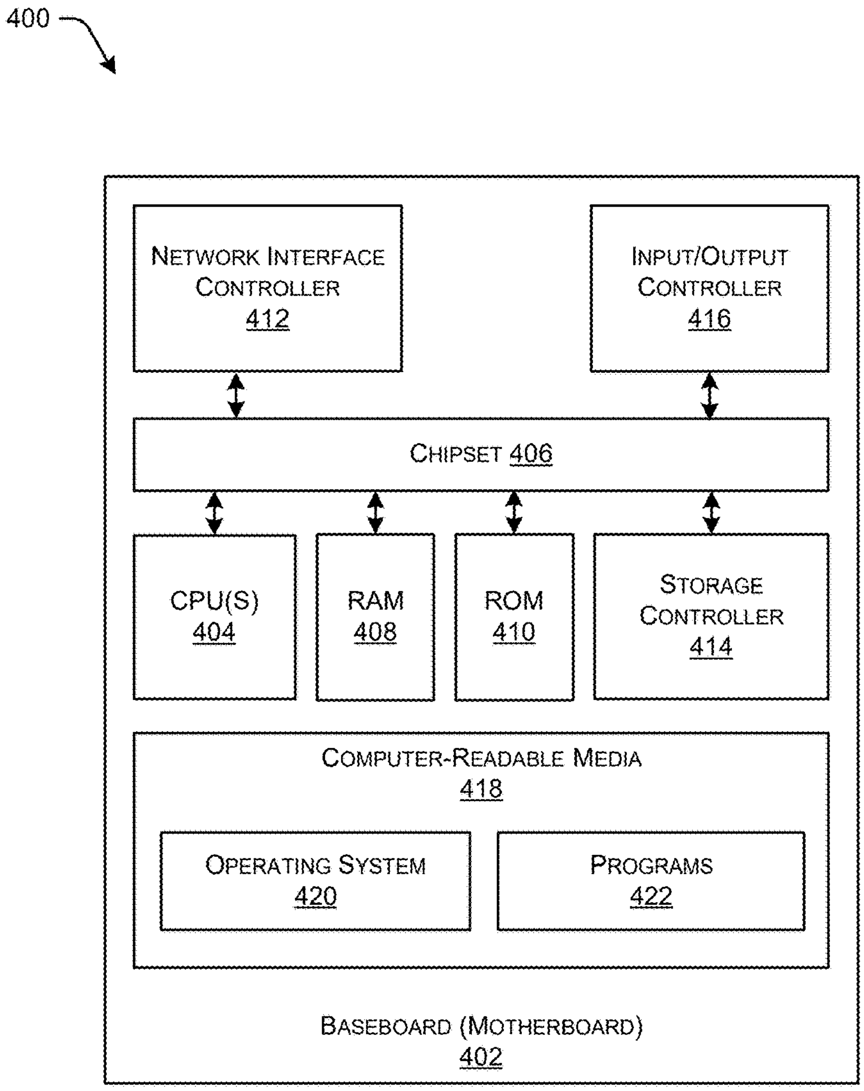
FIG. 4 is a computer architecture diagram showing an example computer hardware architecture for implementing a device that can be utilized to implement aspects of the various technologies presented herein.

FIG. 4 shows an example computer architecture for a computing device 400 capable of executing program components for implementing the functionality described above. In configurations, one or more of the computing devices 400 may be used to implement one or more of the components of FIGS. 1A, 1B, 2, and 3. The computer architecture shown in FIG. 4 illustrates a conventional server computer, router, switch, workstation, desktop computer, laptop, tablet, network appliance, e-reader, smartphone, or other computing device such as, for example, a System-on-Chip (SoS), Application-specific Integrated Circuit (ASIC), etc., and can be utilized to execute any of the software components presented herein. The computing device 400 may, in some examples, correspond to a physical device or resources described herein.

The computing device 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computing device 400. One or more of the CPUs 404 may be replaced by one or more GPUs and/or one or more DPUs.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computing device 400. The chipset 406 can further provide an interface to a computer-readable storage medium such as a read-only memory ("ROM") 410 or non-volatile RAM ("NVRAM") for storing basic routines that help to startup the computing device 400 and to transfer information between the various components and devices. The ROM 410 or NVRAM can also store other software components necessary for the operation of the computing device 400 in accordance with the configurations described herein.

The computing device 400 can operate in a networked environment using logical connections to remote computing devices and computer systems through a network. The chipset 406 can include functionality for providing network connectivity through a NIC 412, such as a gigabit Ethernet adapter. In configurations, the NIC 412 can be a smart NIC (based on data processing units (DPUs)) that can be plugged into data center servers to provide networking capability. The NIC 412 is capable of connecting the computing device 400 to other computing devices over networks. It should be appreciated that multiple NICs 412 can be present in the computing device 400, connecting the computer to other types of networks and remote computer systems.

The computing device 400 can include a storage device 418 that provides non-volatile storage for the computer. The storage device 418 can store an operating system 420, programs 422, and data, which have been described in greater detail herein. The storage device 418 can be connected to the computing device 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computing device 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 can further read information from the storage device 418 by detecting the physical states or characteristics of one or more particular locations within the physical storage units.

In addition to the mass storage device 418 described above, the computing device 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 400. In some examples, the operations performed by the cloud network, and or any components included therein, may be supported by one or more devices similar to computing device 400. Stated otherwise, some or all of the operations described herein may be performed by one or more computing devices 400 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computing device 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computing device 400.

In one embodiment, the storage device 418 or other computer-readable storage media is encoded with computer-executable instructions which, when loaded into the computing device 400, transform the computer from a general-purpose computing system into a special-purpose computer capable of implementing the embodiments described herein. These computer-executable instructions transform the computing device 400 by specifying how the CPUs 404 transition between states, as described above. According to one embodiment, the computing device 400 has access to computer-readable storage media storing computer-executable instructions which, when executed by the computing device 400, perform the various processes described above with regard to FIGS. 1A, 1B, 2, and 3. The computing device 400 can also include computer-readable storage media having instructions stored thereupon for performing any of the other computer-implemented operations described herein.

The computing device 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computing device 400 might not include all of the components shown in FIG. 4, can include other components that are not explicitly shown in FIG. 4, or might utilize an architecture completely different than that shown in FIG. 4.

The computing device 400 may support a virtualization layer, such as one or more virtual resources executing on the computing device 400. In some examples, the virtualization layer may be supported by a hypervisor that provides one or more virtual machines running on the computing device 400 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

attempting, by a controller via a secure channel, to establish a secure connection with a network device via the secure channel;

encountering, by the controller, a host key at the network device, wherein the controller is unfamiliar with the host key;

retrieving, by the controller via a cryptographic channel and from the network device, a list of host keys on the network device;

based on the host key being present on the list of host keys, evaluating, by the controller, a list of audit events indicating host key generation events;

based on a positive evaluation of the list of audit events, confirming, by the controller, validity of the host key; and based on the confirming the validity of the host key, establishing, by the controller via the secure channel, the secure connection with the network device.

2. The method of claim 1, further comprising:

based on the host key not being present on the list of host keys, rejecting, by the controller, the host key; and discontinuing, by the controller, attempting to establish the secure connection with the network device via the secure channel.

3. The method of claim 1, further comprising:

based on a negative evaluation of the list of audit events, rejecting, by the controller, the host key; and discontinuing, by the controller, attempting to establish the secure connection with the network device via the secure channel.

4. The method of claim 3, further comprising:

providing, by the controller, an alert to a user regarding the host key.

5. The method of claim 1, wherein the secure channel comprises a secure shell (SSH) channel.

6. The method of claim 1, wherein the cryptographic channel comprises a transport layer security (TLS) channel.

7. The method of claim 6, further comprising:

verifying, cryptographically by the controller, the TLS channel.

8. The method of claim 1, wherein the list of audit events comprises one or more of (i) the controller has configured a new host key for the network device, (ii) the network device has been returned to a manufacturer resulting in a new host key, (iii) the network device has been upgraded with new software resulting in a new host key, or (iv) a user has manually installed a new host key on the network device.

9. A system comprising:

one or more processors; and one or more non-transitory computer-readable media storing computer-executable instructions that, when executed by the one or more processors, cause the one or more processors to perform actions comprising:

attempting, by a controller via a secure channel, to establish a secure connection with a network device via the secure channel;

encountering, by the controller, a host key at the network device, wherein the controller is unfamiliar with the host key;

retrieving, by the controller via a cryptographic channel and from the network device, a list of host keys on the network device;

based on the host key being present on the list of host keys, evaluating, by the controller, a list of audit events indicating host key generation events;

based on a positive evaluation of the list of audit events, confirming, by the controller, validity of the host key; and based on the confirming the validity of the host key, establishing, by the controller via the secure channel, the secure connection with the network device.

10. The system of claim 9, wherein the actions further comprise:

based on the host key not being present on the list of host keys, rejecting, by the controller, the host key; and discontinuing, by the controller, attempting to establish the secure connection with the network device via the secure channel.

11. The system of claim 9, wherein the actions further comprise:

based on a negative evaluation of the list of audit events, rejecting, by the controller, the host key; and discontinuing, by the controller, attempting to establish the secure connection with the network device via the secure channel.

12. The system of claim 11, wherein the actions further comprise:

providing, by the controller, an alert to a user regarding the host key.

13. The system of claim 9, wherein the secure channel comprises a secure shell (SSH) channel.

14. The system of claim 9, wherein the cryptographic channel comprises a transport layer security (TLS) channel.

15. The system of claim 14, further comprising:

verifying, cryptographically by the controller, the TLS channel.

16. The system of claim 9, wherein the list of audit events comprises one or more of (i) the controller has configured a new host key for the network device, (ii) the network device has been returned to a manufacturer resulting in a new host key, (iii) the network device has been upgraded with new software resulting in a new host key, or (iv) a user has manually installed a new host key on the network device.

17. One or more non-transitory computer-readable media storing computer-executable instructions that, when executed by one or more processors, cause the one or more processors to perform actions comprising:

attempting, by a controller via a secure channel, to establish a secure connection with a network device via the secure channel;

encountering, by the controller, a host key at the network device, wherein the controller is unfamiliar with the host key;

retrieving, by the controller via a cryptographic channel and from the network device, a list of host keys on the network device;

based on the host key being present on the list of host keys, evaluating, by the controller, a list of audit events indicating host key generation events;

based on a positive evaluation of the list of audit events, confirming, by the controller, validity of the host key; and based on the confirming the validity of the host key, establishing, by the controller via the secure channel, the secure connection with the network device.

18. The one or more non-transitory computer-readable media of claim 17, wherein the actions further comprise:

based on the host key not being present on the list of host keys, rejecting, by the controller, the host key; and discontinuing, by the controller, attempting to establish the secure connection with the network device via the secure channel.

19. The one or more non-transitory computer-readable media of claim 17, wherein the actions further comprise:

based on a negative evaluation of the list of audit events, rejecting, by the controller, the host key; and discontinuing, by the controller, attempting to establish the secure connection with the network device via the secure channel.

20. The one or more non-transitory computer-readable media of claim 17, wherein:

the secure channel comprises a secure shell (SSH) channel; and the cryptographic channel comprises a transport layer security (TLS) channel.

* * * * *